No. 638,296. Patented Dec. 5, 1899.
J. H. TALBOT.
BICYCLE TROLLEY CAR.
(Application filed Apr. 13, 1899.)
(No Model.)
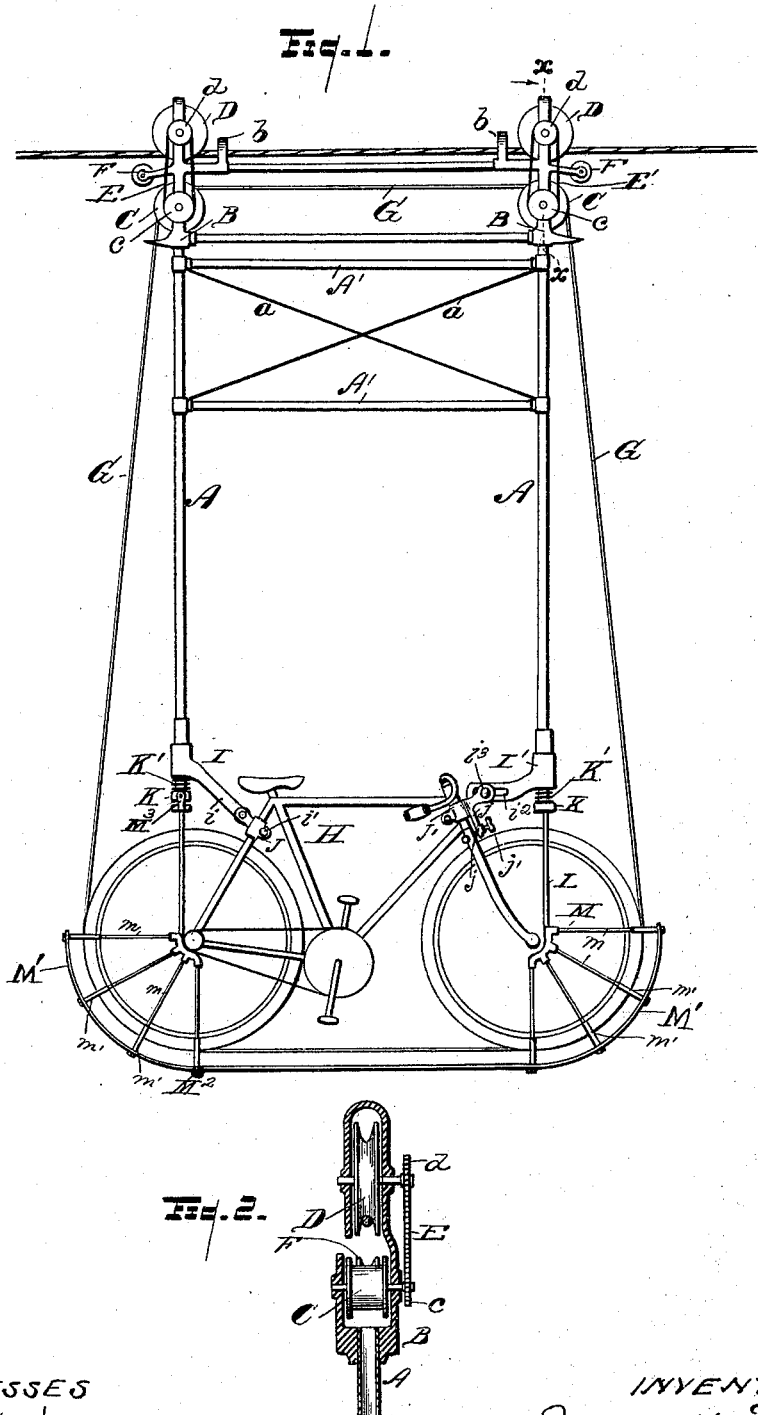
WITNESSES
Frank Duwe.
Rose Orr.
INVENTOR
James H. Talbot
By Fisk Thomas
atty.

UNITED STATES PATENT OFFICE.

JAMES H. TALBOT, OF DETROIT, MICHIGAN.

BICYCLE TROLLEY-CAR.

SPECIFICATION forming part of Letters Patent No. 638,296, dated December 5, 1899.

Application filed April 13, 1899. Serial No. 712,856. (No model.)

*To all whom it may concern:*

Be it known that I, JAMES H. TALBOT, a citizen of the United States, residing at Detroit, county of Wayne, State of Michigan, have invented a certain new and useful Improvement in Bicycle Trolley-Cars; and I declare the following to be a full, clear, and exact description of the invention, such as will enable others skilled in the art to which it pertains to make and use the same, reference being had to the accompanying drawings, which form a part of this specification.

My invention relates to means for mounting a bicycle in a suitable frame or car suspended from an overhead trolley wire or rail, whereby the bicycle when operated by a rider becomes the motor for propelling the car along the wire.

Figure 1 is a side elevation of my apparatus located upon the overhead wire, showing the wheel in position. Fig. 2 is a detail sectional view on the line $x\ x$, Fig. 1.

Referring to the letters of reference employed on both views of the drawings, A A are suitable vertical members, preferably of bicycle-tubing, secured at the top to the castings B B, in which are mounted the pulleys C C. Above these pulleys and mounted in the same castings are the trolley-wheels D D. The shafts on which the pulleys C C and the trolley-wheels D D are mounted extend beyond the arms of the casting and support suitable sprocket-wheels $c\ c$ and $d\ d$, which are connected together by the sprocket-chains E E'.

F F are guard-pulleys mounted in the castings B B and are intended to come in contact with the under side of the trolley-wire and assist in returning the carriage to its normal position if by accident the carriage should lift from the wire at either end.

$b\ b$ are guard-hooks formed on the castings B B, the lower ends of which may extend several inches below the trolley-wire, the object of these guard-hooks being to secure the car from falling to the ground if the trolley-wheels should by accident leave the wire. Instead of hooks, encircling loops secured to the frame may be employed when used on short spans. The preference, however, is given to the hooks, as the car may be readily removed from the wire and replaced at will, while the hooks will afford ample protection against displacement by accident.

A' A' are cross-members, and $a\ a$ suitable diagonal bracing.

G is a belt adapted to travel over the pulleys C C and arranged below to receive and support the bicycle H.

I I' are brackets having a sliding engagement with the upright members A A. The bracket I has an outstanding arm $i$, to which is pivotally secured the spring-clamp J, arranged to clasp the rear fork or any other convenient part of the wheel. The wheel is rigidly secured in the clamp by adjusting the bolt $i'$. The sliding bracket I' has also an extending arm provided with a slot $i^2$, through which the spring-clamp J' is pivotally and adjustably secured by the bolt $i^3$. If desired, both clamps may be provided with a similar sliding adjustment; but it is believed that the one shown will be ample to provide for the varying requirements of different wheels. The clamp J' has a depending arm $j$, adapted to support the adjustable clamping-hook $j'$, arranged to engage the front forks, and thus hold the front in proper alinement with the rear wheel.

K K are stops or abutments secured to the end of the upright members A A for the purpose of supporting the wheel in the frame if the belt should be displaced or when not adjusted under the wheels of the bicycle.

L L are forks secured to the abutments K of the front wheel and to which the belt-guard M is secured. $m$ are rods radiating from a casting secured to the forks and at their outward extremities are provided with friction-rolls $m'$. M' is a suitable shoe to which the rods $m$ are secured. The belt-guard for the rear wheel is similar in general construction, except that provision is made for hinging the same at the point $M^2$, and at $M^3$ a suitable spring clasp or hook holds the guard in position when so desired.

The object in making the rear guard to swing down is to permit the bicycle to readily enter the front guard and to be secured to the car by means of the clamps.

The operation of the device will be readily understood. The bicycle being properly clamped in the frame, the belt is adjusted around the wheels and the rear belt-guard closed and secured. The rider then mounts the wheel and operates the pedals in the ordinary way. The bicycle-wheels resting on the endless belt will drive it and the pulleys and through them the trolley-wheels, causing the car to move along the wire.

While I have shown the trolley mounted in a rigid frame, I contemplate, if found desirable, an adjustable bearing for the wheels whereby they may more readily adapt themselves to curves in the track or cable. I also contemplate lining the clamps J and J' with rubber or other suitable material to protect the enamel of the mounted bicycle from injury.

While I have described my invention as being designed to receive and be driven by a bicycle, it is apparent that suitable fixed driving mechanism operated by the rider may be employed without departing from my invention.

While a rectangular frame using two uprights is shown, a single upright and single trolley may be used where a portable device is desired.

Where the carriage is intended for a heavy person, the spring K' may be used to relieve the belt of excessive weight.

What I claim is—

1. A bicycle-trolley consisting of trolley-wheels, a framework adapted to support said trolley-wheels and to receive a bicycle, and means operated by said bicycle for propelling said trolleys, substantially as described.

2. A bicycle-trolley consisting of a suitable framework, trolley-wheels mounted in said framework, means for supporting a bicycle in said frame, and propelling means connecting said bicycle with the trolley, substantially as described.

3. A bicycle-trolley consisting of trolley-wheels suitably mounted, a framework adapted to receive a bicycle, means for propelling the trolley-wheels a belt connecting the wheels of said bicycle with said means for propelling the trolley-wheels, substantially as described.

4. A bicycle-trolley consisting of a suitable framework, trolley-wheels mounted in said frame, suitable clamping mechanisms for securing a bicycle in the frame, and a belt adapted to drive said trolley-wheels and to support and be driven by said bicycle, substantially as described.

5. The combination of a bicycle, a trolley-carriage adapted to support said bicycle, and means for propelling said trolley-carriage operated by said bicycle, substantially as described.

6. The combination of the trolley, a carriage adapted to transport one or more persons, a belt suspended from said trolley arranged to support said carriage and drive said trolley and means for driving said belt, substantially as described.

7. The combination of a bicycle, a suitable framework to receive said bicycle, trolley-wheels mounted in said frame, a belt adapted to drive said trolley and to support and be driven by the bicycle, and means for retaining said belt in position under said bicycle-wheels, substantially as described.

8. In a bicycle-trolley, a frame adapted to support the bicycle, and a clamping device arranged to clamp the front fork to the frame and to hold the same against rotation, substantially as described.

9. In a bicycle-trolley, a frame adapted to support the bicycle, and the clamping-bolt arranged to grip the fork to hold the same rigid and against side motion, substantially as described.

10. In a bicycle-trolley, the trolley-wheels, the upper and lower frames, the trolley-wheels mounted in the upper frame the prime motor supported in the lower frame the extension connection between the upper and lower frames and the driving-belt whereby the weight of the lower frame and the motor keep the belt taut, substantially as described.

11. In a bicycle-trolley, the upper and lower frames, the trolley-wheels, the prime motor, means connecting the upper and lower frames arranged to allow for their extension, the driving-belt, and a spring arranged to relieve excessive weight on the belt, substantially as described.

12. In a bicycle-trolley, the upper and lower frames, means connecting the frames, arranged to allow for their extension, and means arranged to limit the extension, substantially as described.

In testimony whereof I sign this specification in the presence of two witnesses.

JAMES H. TALBOT.

Witnesses:
S. E. THOMAS,
FRANK DUWE.